United States Patent [19]

Nelson

[11] Patent Number: 4,465,465
[45] Date of Patent: Aug. 14, 1984

[54] COMMUNICATION DEVICE FOR HANDICAPPED PERSONS

[76] Inventor: Bailey Nelson, P.O. Box 425, Cedar Crest, N. Mex. 87008

[21] Appl. No.: 527,111

[22] Filed: Aug. 29, 1983

[51] Int. Cl.³ .............................................. G09B 5/00
[52] U.S. Cl. .................................... 434/112; 434/308
[58] Field of Search ............... 434/112, 116, 308, 309, 434/310, 314, 311, 315, 312, 201

[56] References Cited

U.S. PATENT DOCUMENTS

| | | | |
|---|---|---|---|
| 2,603,006 | 12/1952 | MacChesney | 434/311 |
| 3,292,276 | 12/1966 | Hansel | 434/308 |
| 3,382,588 | 5/1968 | Serrell | 434/314 |
| 3,516,176 | 6/1970 | Cleary et al. | 434/315 |
| 3,584,398 | 6/1971 | Meyer | 434/201 |
| 3,609,878 | 10/1971 | Bender | 434/309 |
| 3,648,385 | 3/1972 | Barlow | 434/312 |
| 3,651,512 | 3/1972 | Summers | 434/112 X |
| 3,696,525 | 10/1972 | Cleary | 434/311 |
| 3,925,779 | 12/1975 | Gerstenhaber | 434/112 X |
| 4,306,368 | 12/1981 | Coghill et al. | 434/112 X |

*Primary Examiner*—William H. Grieb
*Attorney, Agent, or Firm*—LaValle D. Ptak

[57] ABSTRACT

A communications device suitable for use by severely handicapped persons having speech impairments and capable of only spastic movements comprises a housing in which speech reproduction apparatus is located for storing and reproducing pre-recorded audio message segments. The exterior of the housing has a nearly horizontal front portion on a console on which three relatively large (approximately 5"×5") pressure-operated paddle switch actuator members are located. A vertical display panel is located immediately behind the paddle actuators and has on it visual aid cards which have a symbol identical to the recorded message which is to be reproduced by actuation of the appropriate paddle. Pressure on the selected paddle closes a switch which turns on a light associated with the selected visual aid card and also actuates the reproduction of an audio message corresponding to the visual aid card.

17 Claims, 4 Drawing Figures

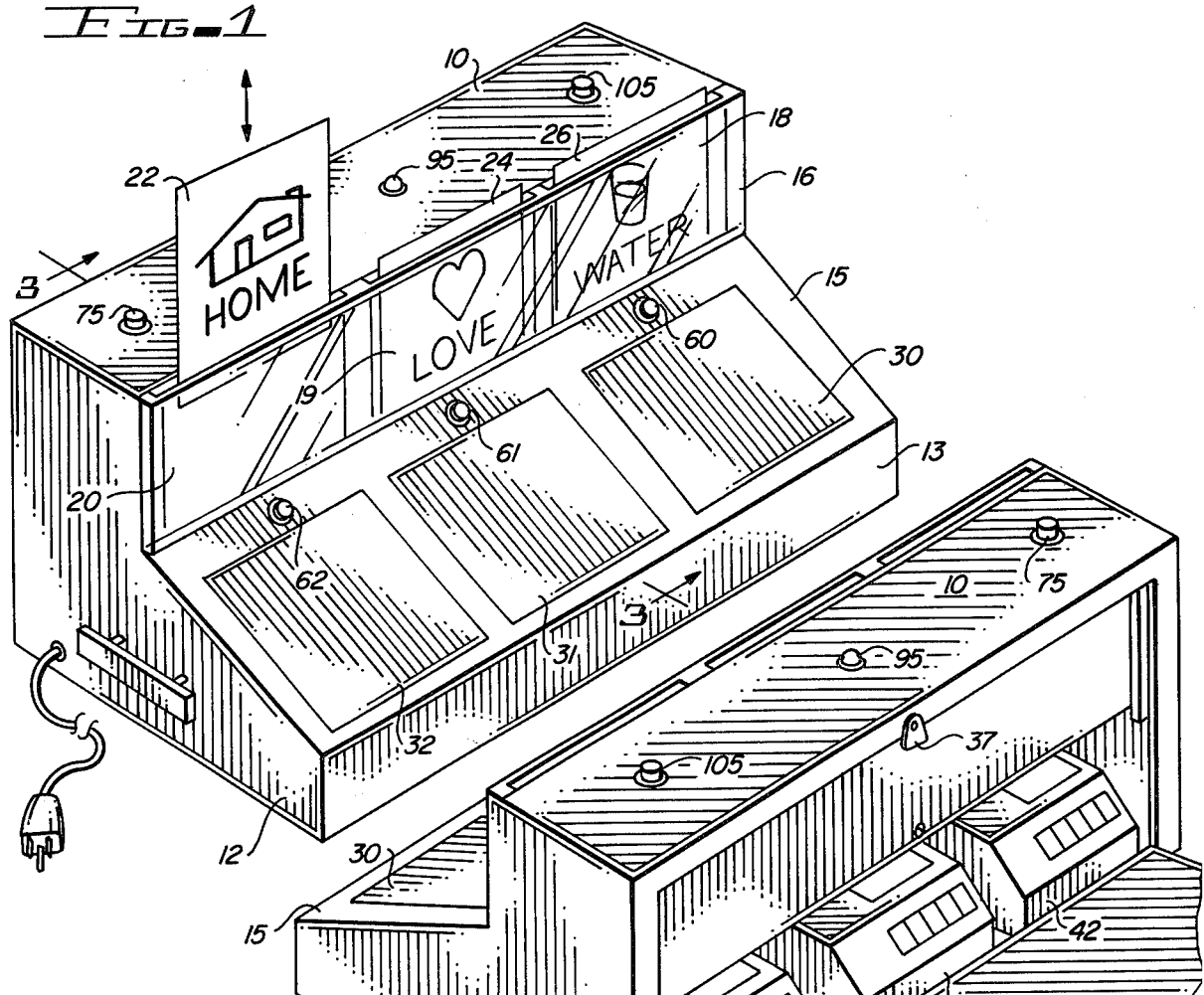
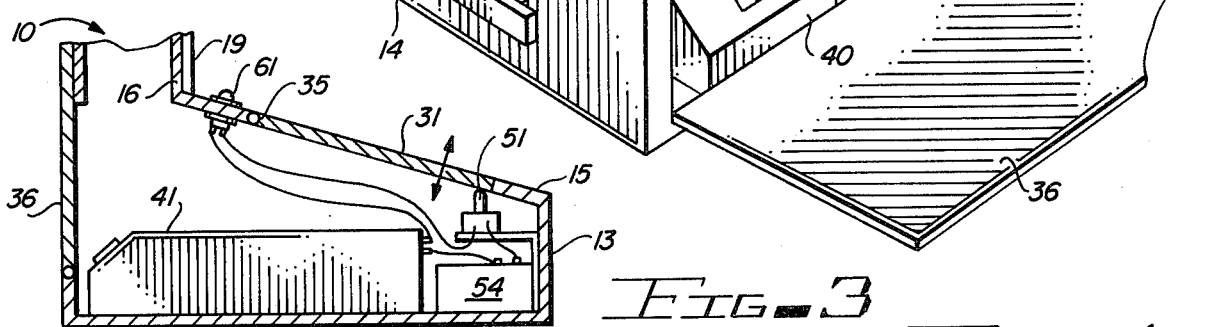
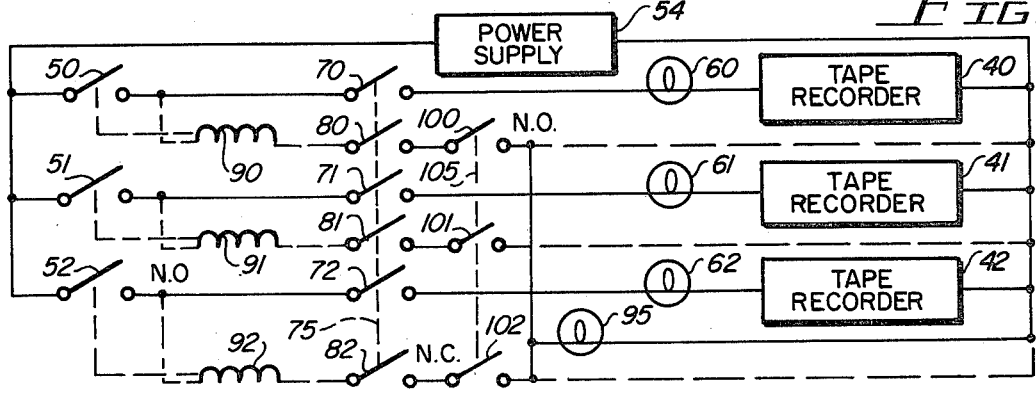

COMMUNICATION DEVICE FOR HANDICAPPED PERSONS

BACKGROUND OF THE INVENTION

Non-vocal mentally and physically handicapped persons, such as athetoid persons and the like, have extreme difficulty in communicating even basic desires and needs to those who are charged with their care. This results in a great deal of frustration, both for the handicapped person and for those who care for them.

Attempts have been made in the past to develop machines or devices to bridge the communications gap between handicapped persons and others. Usually, these include a number of selections (identified either by word or picture) and a pushbutton or other selection means which can be used by the person who desires to communicate with others. While machines or selection devices of this type work with stroke victims, they are unusable with severely physically handicapped persons who are incapable of the accuracy required to push the desired pushbutton or move letters on a writing board or the like. Frequently, mentally and physically handicapped persons of the type under consideration here have only limited spastic control over the movement of their extremities. It is impossible for such persons to use their fingers, for example, to accurately hit a selected key on a typewriter or calculator keyboard of standard type. Consequently, switches which can be activated by somewhat sweeping and inaccurate movement of an extremity of the patient must be located in positions to permit the patient to summon an attendant for help and the like. The problem of communicating the actual need, however, still exists.

Devices have been developed as teaching aids for teaching very young children or retarded children by means of picture/word association. Two patents which are of interest in this field are the patents to Cleary, U.S. Pat. No. 3,516,176, and Cleary, U.S. Pat. No. 3,696,525. The U.S. Pat. No. 3,516,176 is directed to a touch directing teaching machine for the purpose of teaching such word/picture association to such children. The machine displays a simple word above three pictures (one of which corresponds to the word). The student or patient is to touch the correct picture; and if this is done, a switch is operated to activate a recorder which produces the word in spoken form from a loudspeaker. If an incorrect picture is touched, a different result is obtained. Although the system of the patent operates to produce a spoken output corresponding to the picture under a pre-established set of conditions, it is not directed to severely physically handicapped persons. All of the switches and pictures and displays are on a vertical panel. Consequently, it is difficult or impossible for severely handicapped persons to operate this device.

The Cleary U.S. Pat. No. 3,696,525 also is directed to a touch teaching system with three picture display panels. A recording including a question is played. The question is usually in a form directing the student to touch the picture corresponding to the question. If the correct picture is then touched after the question is asked, the machine plays an affirmation message and goes on to a new set of pictures and questions. If the incorrect picture is touched, the question is repeated. This is strictly a teaching device and is not used for the purpose of communicating or initiating messages from the student (or handicapped patient) as an effort to communicate with the teacher or attendant. Once again, the structure of this device does not lend itself to use by severely physically handicapped persons.

Another teaching device which is somewhat similar to the Cleary U.S. Pat. No. 3,696,525 system is disclosed in the patent to Serrell, U.S. Pat. No. 3,382,588. In this patent, a system is disclosed which projects an image on a screen. A recording with various commands in it is played with a stop after each command. The child or student then touches an area on the screen which is the correct answer to the question or command. A sensor then responds with an affirmative spoken response and advances the recording to the next question or picture. If the incorrect area of the screen is touched, the first recorded question is repeated. Thus, this device is a response expression interaction device for teaching very young children. It is not at all suitable, however, for use with handicapped persons as a communication initiating device.

Another teaching device which is generally related to those discussed above is disclosed in the patent to Bender, U.S. Pat. No. 3,609,878. Bender discloses a small box which displays a picture of a small number (shown as 3) of multiple choice words appearing beneath clear-topped switches. The device is for the purpose of teaching very young children to associate pictures with words. Selection by pressing on the correct word associated with the picture causes a "reward" operation of the machine. Depression of the incorrect choice rewards in a "punish" response, such as repetition of the question or the requirement for the pressing of a reset button in order to put the machine back in a mode where it again will respond to further depression of the word buttons. The system of this patent, however, is in no way directed to or suitable for use with severely handicapped persons to enable them to initiate communications with others.

It is desirable to provide some means to enable severely physically handicapped persons, who generally also are unable to communicate through normal speech, to initiate communications of their desires, needs, or wants with the persons who are assigned to their care. To be effective, such a device must be capable of operation by the handicapped person in a simple and easy manner to avoid frustration on the part of such a person. Its operation must be simple to understand, since such handicapped persons frequently are also severely mentally retarded. In addition, it should be capable of clear communication with the persons to whom the desires, needs, or wants of the handicapped person are to be directed.

SUMMARY OF THE INVENTION

Accordingly, it is an object of this invention to provide an improved communications tool.

It is another object of this invention to provide an improved communications tool for use by young children and handicapped persons.

It is an additional object of this invention to provide a communications tool through which severely physically handicapped persons can communicate their desires to the persons caring for them.

It is a further object of this invention to provide a communications tool for severely handicapped persons which permits such persons to select one of several pre-recorded messages for audible reproduction to communicate the desires of such handicapped persons.

In a preferred embodiment of this invention, a communications device for handicapped persons is placed in a housing which can be located near the bed or chair of such persons. Means are provided in the housing for storing and reproducing a plurality of pre-recorded audio message segments. A plurality of visual displays, each corresponding respectively to a different one of said pre-recorded audio message segments, then are provided in a position for observance by the user of the device. A plurality of substantially horizontal, relatively large, paddle switch actuator members, associated with corresponding ones of the visual displays and the audio message segments, are located on the housing. These paddle members are positioned so that they are capable of selective actuation by various portion of a person's body, in addition to the fingers. Switches are individually controlled by each of the paddle switch actuator members to electrically interconnect a power supply with a selected one of the pre-recorded audio message segments which corresponds to an actuated paddle switch actuator member.

In a more specific embodiment, a visual indication in the form of a light associated with the visual display also is turned on to indicate to the user of the system the visual display selected by the paddle switch actuator member.

BRIEF DESCRIPTION OF THE DRAWINGS

FIGS. 1 and 2 are front and back perspective views of a preferred embodiment of the invention;

FIG. 3 is a partial cut-away view taken along the line 3—3 of FIG. 1 to illustrate the arrangement of components within the device shown in FIGS. 1 and 2; and FIG. 4 is a schematic diagram of the circuit interconnections of the components shown in FIGS. 1, 2, and 3.

DETAILED DESCRIPTION

Reference now should be made to the drawing in which the same reference numbers are used in the different figures to designate the same components.

Reference first should be made to FIGS. 1 and 2 which illustrate a preferred embodiment of a communication device having a housing 10. The housing has general dimensions of approximately 18" wide, 15" deep, and 10" high at the rear. A pair of side panels, 12 and 14, are in the general form of a stepped "L" interconnected at the front by an elongated rectangular panel 13. The legs of the "L"-shaped side panels 12 and 14 extend upwardly from the upper edge of the panel 13 at a slight angle (approximately 15 degrees) to a point near the rear of the housing 10. This surface is covered with a member 15 to a point near the rear of the housing 10. At the rearmost edge of the member 15, a vertical display panel 16 interconnects that edge and the top of the housing 10, as shown most clearly in FIG. 1.

The panel 16 is shown in FIGS. 1 and 2 as having three visual display sections in it. These display sections are illustrated as being changeable displays, and the three sections each are covered over with transparent glass or plastic windows 18, 19, and 20, respectively. Display cards carrying a simple picture and a word (or words) associated with that picture are inserted through a slot at the top of each of the windows 18, 19, and 20 to be visible through the windows to a person sitting in a chair or wheelchair or lying in a bed near the table or surface on which the housing 10 is placed. In FIG. 1, one of these display cards 22 carrying a picture of a house and the word "home" is shown partially inserted into the slot behind the window 20. Similar cards 24 and 26 for the words "love" and "water" are shown inserted behind the windows 19 and 18, respectively, for display through those windows.

On the surface 15 immediately adjacent each of the windows 18, 19, and 20 are three corresponding paddle switch actuators 30, 31, and 32. These are relatively large in size (from 3" to 6" wide and 3" to 6" long, and preferably approximately 5"×5") to permit their contact and actuation by the whole hand of a patient or by the patient's elbow, forearm, or the like. Typically, these paddles 30, 31, and 32 are mounted in the panel 15 by means of a hinge 35 (shown most clearly in FIG. 3) along their upper edge. A strong piano hinge or its equivalent is used. The lower edges of the paddles 30, 31, and 32, that is, the edges nearest the front panel 13, are free to move downwardly a limited amount for actuating or closing corresponding switches located inside the housing 10. The manner in which this is done and reason for it is described subsequently.

In FIG. 2, a rear door 36 of the housing 10 is shown in its open position. In normal use, this door 36 is pivoted upwardly and held closed by means of a latch 37. In FIG. 2, however, the location of three cassette tape recorders 40, 41, and 42, which correspond respectively to the paddles 30, 31, and 32, is shown within the cabinet 10.

The cassette recorders 40, 41, and 42 each have a pre-recorded message segment recorded on a tape in them. This message segment may be repeated throughout the length of a standard cassette tape or may be recorded on an endless loop tape. The message corresponds to the picture and word on the display card located behind the windows 18, 19, and 20 directly above the associated paddle switch actuator members 30, 31, and 32. For example, the message recorded in the tape recorder 40 corresponds to a picture of a glass of water and the word "water" on the card 26 located behind the window 18. In operation of the system, when the handicapped individual depresses the paddle 30, the message recorded on the tape recorder 40 is played. For the example under consideration, this message could be: "Please bring me a glass of water". Thus, a person who is unable to vocalize his desires and who is unable to personally carry out his desires is able to communicate in a direct manner those desires to the persons who are caring for him. Similar responses are made to each of the other two cards which are behind the display windows 19 and 20. For example, the center one for the word "love" could simply create the audible statement "I love you". The card 22 which is placed behind the window 20 for the word "home" could initiate a response from the recorder 42 the statement "I want to go home" or some similar associated statement.

The manner in which all of this is controlled is illustrated most clearly in FIGS. 3 and 4. As mentioned previously, FIG. 3 is a partially cut-away portion of the apparatus showing the manner in which components may be located in the housing 10. The physical location of the various components within the apparatus is best observed in FIG. 3. The tape recorder 41 and its location beneath the paddle 31 is shown. As described previously, when the paddle 31 is pushed downwardly, it pivots about the hinge 35 and operates a switch 51 to close the switch. This completes an operating circuit from a power supply 54 (which can simply be supplied from a normal A.C. household line plug) to turn on the tape recorder 41 to play the pre-recorded message stored in it.

As also shown in FIG. 2, a light 61 is connected in series with the power supply 54, switch 51, and tape recorder 41; so that the light 61 also is turned on when the switch 51 is closed. A similar result occurs for each of the other paddles 30 and 32 to cause illumination of corresponding lights 60 and 62 whenever those paddles are depressed downwardly. The location of these three lights is shown most clearly in FIG. 1. Thus, when any one paddle 30, 31, or 32 is depressed, the light associated with the display directly above it is turned on. This way the handicapped operator and the person responding to the message visually know which message was selected, as well as audibly hearing the message as played by the corresponding tape recorder.

FIG. 4 shows a typical circuit diagram of the system illustrated in FIGS. 1, 2, and 3. Three switches, 50, 51, and 52, similar to the switch 51 shown in FIG. 3, are located beneath the foreward edges of the corresponding paddles 30, 31, and 32. These are normally open switches and may be in the form of spring biased pushbutton switches which are held operated so long as pressure is applied to the corresponding paddle member. This is the most basic form of the invention.

Assume that the paddle 31 is depressed to close the switch 51. When this occurs, a circuit is completed from the power supply 54 through the now-closed switch 51 and a normally closed reset switch 71 through the lamp 61 to the tape recorder 41. Thus, the lamp 61 is illuminated and the tape recorder 41 is activated to play the pre-recorded message in it. For the paddle 31, this is the message associated with the display card 24 for the word "love". Thus, the light 61 beneath this display card is illuminated and the tape recorder plays the pre-recorded message "I love you" or some similar message. In this version, when the pressure is removed from the paddle 31, the circuit would be broken, the light 61 extinguished, and the tape recorder 41 turned off. Similar operation of the tape recorders 40 and 42 and the associated lights 60 and 62 occurs for closure of the switches 50 and 52 associated, respectively, with the paddles 30 and 32.

Because of the nature of the physical handicap of persons using the device, it frequently is desirable to hold the operated switch 50, 51, or 52 closed after the release of pressure on the associated paddle. To do this, holding relay coils 90, 91, and 92 are shown associated with each of the three switches 50, 51, and 52. Closure of the associated switch applies current through the corresponding relay coil through a normally closed associated reset switch 80, 81, or 82 and a closed contact 101, 101, or 102 of an intermittent/non-intermittent control switch 105. The switch 105 normally is open, but when a non-intermittent operation of the message (that is, repeated message) is desired, all three contacts 100, 101, and 102 of the switch 105 are closed. Thus, current flows through the initially closed associated switch 50, 51, and 52 through its corresponding holding relay coil 90, 91, or 92 which then maintains the associated switch closed until the appropriate contact 100, 101, or 102 of the switch 105 is opened or until the master reset switch contact 80, 81, or 82 of the reset switch 75 is opened.

If non-intermittent operation is not desired, the contacts of the switch 105 are opened and the relay coils 90, 91, and 92 are inoperative. In such a case, the associated tape recorders and the indicator lights for the three switches 50, 51, and 52 are activated only so long as those switches are held closed by depression of associated paddles 30, 31, or 32.

One other indicator light is shown in FIG. 4 and that is the light 95 which is connected in common with the stationary contact of the switches 100, 101, and 102. Thus, if the system is being operated in its non-intermittent mode (switch 105 contacts 100, 101, and 102 closed) and any one of the relays 90, 91, or 92 is holding its corresponding switch 50, 51, or 52 closed, the light 95 is turned on. This indicates the mode of the system operation even if, for some reason, the selected tape recorder 40, 41, or 42 should somehow no longer be producing a message. This could be the result of a borken tape or a tape which has run to its end. Thus, the nurse or custodian of the handicapped person would know that a message attempt had been made, but that the system requires rewinding of the tape or some other attention.

The basic circuit interconnections for operating the system are shown in FIG. 4. It may be desirable, however, to provide an interlock to prevent simultaneous actuation of more than one of the tape recorders 40, 41, or 42 and the associated indicator lights in the event the user of the system should depress more than one of the paddles 30, 31, or 32 simultaneously, or in sequence when the holding coils 90, 91, or 92 are operative. To do this, it is a relatively simple matter to provide another set of switch contacts for each of the switches 50, 51, and 52 which open the two undesired circuits at the time the desired circuit is closed. This then would prevent operation of more than one message playback and indicator light 60, 61, and 62 at a time.

By use of tape recorders 40, 41, and 42, and the removable display cards 22, 24, and 26, the different messages to be selected can be changed easily at appropriate times. Thus, the system can be used as a teaching or learning device, as well as a communications device. Different cards may be inserted behind the windows 18, 19, and 20, accompanied by corresponding changes in the messages of the associated tape recorders. Two or more machines with different messages in them may be located near the patient to permit operation or selection of more than the three paddle actuator switch members 30, 31, and 32 shown in FIGS. 1 and 2. Generally, however, it is important to have the number of possible choices of selections at a minimum due to the mental handicaps which often accompany the extreme physical handicaps for the persons for whom the machines are to be used.

An alternative (not shown) to permit a selection of up to eight different message choices by actuation of the three paddles 30, 31, and 32 can be accomplished by providing two banks of four visual and word combination choices in a taller vertical display panel 16 than the one illustrated in FIG. 1. The four choices for one bank would be above the paddle 32 and the four choices for the other would be above the paddle 30. These choices would be of one or the other bank. In between the display banks, four different indicator lights comparable to the three lights 60, 61, and 62 could be vertically arranged. Thus, a light could be located between the uppermost choice of the display above the paddle 32 and the uppermost choice of the paddle member 30. Similarly, the next lower choice would be separated by a second light, and so on. In this arrangement, the paddle 31 then could be used to cause stepping of the illumination of the different indicator lights in response to each closure or pressure on the paddle 31. When the light is opposite the desired choice (either above the paddle 32 or the paddle 30), the appropriate paddle 30 or 32 is depressed to select the choice above that member on the visual display which is adjacent the illuminated display lamp. An appropriate recorded message corresponding to the selected choice then would be played. This permits a multiple number of messages to be played and displayed while still using only three paddles 30, 31, and 32. Other arrangements obviously could be used.

In place of the tape recorders 40, 41, and 42, it also is possible to use currently available voice synthesizer systems. These systems have the capability of recording messages by way of an analog to digital converter in a digital memory. This information then is reproduced by "playing it back" from the memory through a system which converts the digitally stored information to analog information synthesized back into the original speech. The end result, so far as the user of the system shown, is exactly the same as with the recorders 40, 41, and 42. In fact, the users would not even know that there was anything different in the system.

As is apparent from the foregoing, the system is intended for use by persons who are either physically or mentally handicapped or both. It primarily is used to assist individuals who do not have the use of their speech facilities or who have considerable difficulty vocalizing understandable speech. The system also has the capability of being used as an aid for teaching spelling to small children or handicapped children and it may be used as a tool for evaluation of therapy progress. In addition, the device provides motivation and incentive to its users which improve motor coordination between eyes, ears, limbs and mouth. A severely physically handicapped person is able to control, by means of this communication device, the actions of those who are caring for him in a direct manner. This is not possible without some interface tool such as described above and shown in the drawing.

Even the slowest reaction of the handicapped person operating the device is sufficient to activate it to bring about the desired response. Thus, it provides a distinct communication for persons with very impaired bodies. The paddles 30, 31, and 32 also may be fitted with auxiliary activation controls, if necessary.

As is apparent from the foregoing, each paddle 30, 31, or 32 controls one complete function. Whenever the paddle is depressed to the point where the switch below it becomes operated, current is supplied to illuminate the indicator light located below the card for the desired message or communication. This light then helps to cause a retarded child to look up toward the card which visually displays the function or message selected. The tape recorder associated with that function or message then plays that message. The recording pronounces the word or phrase selected by the card either so long as the paddle is depressed or, if the mode switch is in the non-intermittent position, the message is played continually until a manual reset button 75 is used to interrupt the play-back operation.

The display board 16 is at an ideal height and angle for easy reading by persons in wheelchairs. This is in contrast to many communication boards which lie flat on a table. Such orientation does not easily permit a person with limited head or eye control to observe them.

The panel 15 on which the panels 30, 31, and 32 are located is at a slight angle which permits a sight association by the user with the indicator light and display. The switches are set to be operated by very light touch by those with impaired limbs. The large size of the paddles is selected to accomodate a whole hand or other portion of a limb and permits contact with only a small degree of accuracy required of the user of the system.

By using custom taped messages and matching display cards, any language desired may be accomodated by the system. In addition, the taped messages can be in the voice of either sex, adult or child, and may have a regional accent, if desired. This has been found to be particularly satisfying to users of the system when the voice is tailored to the age, sex and regional background of the system user. In a system which has been actually used, the handicapped persons using the system were excited in its use because of the substantial expansion of their world brought about by the system.

The foregoing is to be considered as illustrative of the invention and not as limiting. Various changes and modifications will occur to those skilled in the art beyond those which have been specifically mentioned above as alternative approaches to the embodiment shown in the drawing. Such changes and modifications can be made without departing from the true scope of the invention as set forth in the following claims.

I claim:

1. A communications device for handicapped persons including in combination:
   a housing;
   first means mounted in said housing for storing and reproducing a plurality of pre-recorded audio message segments;
   a plurality of visual displays each corresponding respectively to a different one of said pre-recorded audio message segments;
   a plurality of substantially horizontal, relatively large, paddle switch actuator members associated with corresponding ones of said visual displays and said audio message segments, said paddle switch actuator members being capable of selective actuation by various portions of a person's body in addition to individual fingers;
   power supply means;
   a plurality of switch means each controlled by a different one of said paddle switch actuator members and electrically interconnecting said first means and said power supply means to cause said first means to reproduce a selected one of said pre-recorded audio message segments corresponding to a selected paddle switch actuator member.

2. The combination according to claim 1 further including a vertical display panel means on said housing wherein said plurality of said visual displays are located on said display panel means and each of said visual displays is located in a position adjacent the paddle switch actuator member corresponding to such visual display and the associated corresponding audio message segment.

3. The combination according to claim 2 wherein said plurality of paddle switch actuator members comprises three paddle switch actuator members arranged side by side near the front of said housing and extending from the front rearwardly and upwardly therefrom at an angle of approximately 15 degrees, and wherein said vertical display panel means rises vertically behind said paddle switch actuator members and includes at least three visual displays corresponding to the message segments to be selected by actuation of said paddle switch actuator members.

4. The combination according to claim 3 wherein said paddle switch actuator members are actuated by pressure on the surface thereof and wherein said switch means are located beneath each of said paddle switch actuator members for operation thereby in response to pressure on the corresponding paddle switch actuator member.

5. The combination according to claim 4 further including a plurality of light means associated with each of said plurality of visual displays wherein actuation of a paddle switch actuator member to operate one of said switch means out of said plurality of switch means functions to electrically connect said corresponding light means with said power supply simultaneously with the operation of said first means to reproduce said selected pre-recorded audio message segment corresponding to said selected paddle switch actuator member.

6. The combination according to claim 5 wherein each of said light means is located adjacent the visual display selected by the corresponding paddle switch actuator member and is illuminated during the time said switch means controlled by the corresponding paddle switch actuator member is operated.

7. The combination according to claim 6 wherein said visual displays comprise changeable visual displays and wherein said first means include means for changing selected ones of said pre-recorded audio message segments to different pre-recorded audio message segments corresponding to different visual displays placed on said display panel means.

8. The combination according to claim 7 wherein said paddle switch actuator members have dimensions ranging from 3 inches to 6 inches wide and 3 inches to 6 inches long.

9. The combination according to claim 8 wherein each of said pre-recorded message segments is recorded on a separate cassette tape recorder located within said housing.

10. The combination according to claim 1 wherein said pre-recorded audio message segments are recorded on a tape recorder.

11. The combination according to claim 10 wherein said tape recorder comprises a cassette tape recorder.

12. The combination according to claim 11 wherein each of said pre-recorded message segments is recorded on a separate cassette tape recorder located within said housing.

13. The combination according to claim 1 wherein said paddle switch actuator members have dimensions ranging from 3 inches to 6 inches wide and 3 inches to 6 inches long.

14. The combination according to claim 13 further including a vertical display panel means on said housing wherein said plurality of said visual displays are located on said display panel means and each of said visual displays is located in a position adjacent the paddle switch actuator member corresponding to such visual display and the associated corresponding audio message segment.

15. The combination according to claim 14 wherein said plurality of paddle switch actuator members comprises three paddle switch actuator members arranged side by side near the front of said housing and extending from the front rearwardly and upwardly therefrom at an angle of approximately 15 degrees, and wherein said vertical display panel means rises vertically behind said paddle switch actuator members and includes at least three visual displays corresponding to the message segments to be selected by actuation of said paddle switch actuator members.

16. The combination according to claim 15 wherein said paddle switch actuator members are actuated by pressure on the surface thereof and wherein said switch means are located beneath each of said paddle switch actuator members for operation thereby in response to pressure on the corresponding paddle switch actuator member.

17. The combination according to claim 1 further including a plurality of light means associated with each of said plurality of visual displays wherein actuation of a paddle switch actuator member to operate one of said switch means out of said plurality of switch means functions to electrically connect said corresponding light means with said power supply simultaneously with the operation of said first means to reproduce said selected pre-recorded audio message segment corresponding to said selected paddle switch actuator member.

* * * * *